United States Patent
Rahman et al.

(10) Patent No.: US 12,164,542 B1
(45) Date of Patent: Dec. 10, 2024

(54) SYSTEMS AND METHODS FOR SYNCHRONIZATION OF DATA

(71) Applicant: The Toronto-Dominion Bank, Toronto (CA)

(72) Inventors: Syeda Suhailah Rahman, Mississauga (CA); Nithin Balaji Venkatnarayanan, Etobicoke (CA); Nayomi Jayatileke, Mississauga (CA); Khanh D. Tran, Thornhill (CA); Mukul Gulati, Etobicoke (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/347,189

(22) Filed: Jul. 5, 2023

(51) Int. Cl.
*G06F 16/27* (2019.01)
*G06F 16/23* (2019.01)

(52) U.S. Cl.
CPC .......... *G06F 16/27* (2019.01); *G06F 16/2365* (2019.01)

(58) Field of Classification Search
CPC .............................. G06F 16/27; G06F 16/2365
See application file for complete search history.

(56) References Cited

U.S. PATENT DOCUMENTS

| | | | |
|---|---|---|---|
| 8,001,082 B1 * | 8/2011 | Muratov | G06F 16/27 707/634 |
| 8,868,497 B2 | 10/2014 | Yan et al. | |
| 10,216,820 B1 * | 2/2019 | Holenstein | G06F 16/2358 |
| 11,080,618 B2 | 8/2021 | Kam et al. | |
| 11,556,280 B2 | 1/2023 | Gold et al. | |
| 11,768,853 B2 * | 9/2023 | Ofenloch | G06F 16/214 707/610 |
| 11,803,568 B1 * | 10/2023 | Jain | G06F 11/3409 |
| 2005/0289342 A1 * | 12/2005 | Needham | G06F 21/6227 713/169 |
| 2008/0082555 A1 * | 4/2008 | Salmon | H04L 67/1097 |
| 2010/0030730 A1 * | 2/2010 | Shang | G06F 16/27 707/637 |
| 2016/0217042 A1 * | 7/2016 | Wang | G06F 11/1469 |
| 2018/0004828 A1 * | 1/2018 | Kathuria | G06F 16/27 |
| 2020/0327252 A1 * | 10/2020 | Mcfall | G06F 21/78 |

(Continued)

FOREIGN PATENT DOCUMENTS

JP     5467032 B2    4/2014

*Primary Examiner* — Robert W Beausoliel, Jr.
*Assistant Examiner* — Susan F Rayyan
(74) *Attorney, Agent, or Firm* — Marks & Clerk (57) ABSTRACT

Computer-implemented systems and methods for synchronizing data for dataset execution. The system includes a source database that stores a canonical dataset, a secondary database that stores a processed dataset, and a synchronization server that comprises a processor and a memory. The processor is configured to monitor for a publication of one or more source tables and when the publication is detected, identify the processed tables, corresponding to the source tables, to be updated in the processed dataset. The processor determines a tolerance level corresponding to each processed table and updates the processed tables in the processed dataset. The processor determines whether the processed tables in the processed dataset were successfully updated within the tolerance levels and transmits a notification based on determining whether the processed tables in the processed dataset were successfully updated within the tolerance levels.

16 Claims, 4 Drawing Sheets

(56) References Cited

U.S. PATENT DOCUMENTS

| | | | | |
|---|---|---|---|---|
| 2020/0364241 A1* | 11/2020 | Stolze | ................. | G06F 16/2365 |
| 2021/0049205 A1* | 2/2021 | Frank | ..................... | G06Q 30/00 |
| 2022/0179910 A1 | 6/2022 | Bharathy et al. | | |
| 2023/0047919 A1 | 2/2023 | Queguiner et al. | | |
| 2023/0096966 A1 | 3/2023 | Iyer et al. | | |
| 2023/0121060 A1* | 4/2023 | Teixeira de Abreu Pinho | ............ | G06F 9/4843 |
| | | | | 707/798 |
| 2023/0153314 A1* | 5/2023 | Martin | ................ | G06F 16/2282 |
| | | | | 707/746 |
| 2023/0281220 A1* | 9/2023 | Lee | ....................... | G06F 16/273 |
| | | | | 707/610 |
| 2023/0334176 A1* | 10/2023 | Hajarian | ............. | G06F 21/6254 |
| 2023/0342481 A1* | 10/2023 | Nikoghossian | ......... | G06F 21/62 |
| 2023/0368048 A1* | 11/2023 | Yang | ....................... | G06N 20/00 |
| 2023/0409594 A1* | 12/2023 | Geiselhart | ............. | G06F 16/275 |

\* cited by examiner

SYSTEMS AND METHODS FOR SYNCHRONIZATION OF DATA

TECHNICAL FIELD

The disclosed exemplary embodiments relate to computer-implemented systems and methods for processing data and, in particular, to systems and methods for the synchronization of data.

BACKGROUND

Within a computing environment, there may exist databases or data stores that contain sensitive information (e.g., personally identifiable information or "PII") that is required to be kept confidential. Often, it is not the entire record that is sensitive, but merely an element of the record. For example, an identifier number may be considered sensitive, while an identifier type may not.

In many cases, it may be desirable to use the data in the data store, or portions thereof, for additional purposes, or to reveal portions of the data to certain individuals or entities. For instance, the data may be used to train or test machine learning models. In such cases, to protect any sensitive information in the data, obfuscation or masking can be employed to conceal or remove the sensitive information, such that it cannot be identified in the data to be used.

SUMMARY

The following summary is intended to introduce the reader to various aspects of the detailed description, but not to define or delimit any invention.

In at least one broad aspect, there is provided a system for synchronizing data for dataset execution, the system comprising: a source database storing a canonical dataset; a secondary database storing a processed dataset; a synchronization server comprising a processor and a memory, the processor configured to: monitor for a publication of one or more source tables; when the publication is detected, identify the one or more processed tables to be updated in the processed dataset, the one or more processed tables corresponding to the one or more source tables; determine one or more tolerance level corresponding to each of the one or more processed tables, the one or more tolerance level based on an execution requirement of a downstream application; update the one or more processed tables in the processed dataset; determine whether the one or more processed tables in the processed dataset were successfully updated within the one or more tolerance level; and transmit a notification based on determining whether the one or more processed tables in the processed dataset were successfully updated within the one or more tolerance level.

In some cases, the processor may be further configured to create a checkpoint prior to updating the one or more processed tables in the processed dataset.

In some cases, a selected table of the one or more processed tables may have a selected tolerance level of the one or more tolerance level associated therewith, and wherein the execution requirement for the selected table may be determined by: analyzing an update frequency of the selected table; analyzing an expected execution time of the downstream application; and determining whether the selected table can be successfully updated prior to the expected execution time based on the update frequency and the selected tolerance level.

In some cases, the downstream application may be a machine learning model.

In some cases, the system may further comprise a publisher server comprising a first processor and a first memory, the first processor configured to publish the one or more source tables.

In some cases, the one or more processed tables may be transformed into a format compatible with the machine learning model.

In some cases, the one or more source tables may be generated by processing the canonical dataset to remove sensitive information.

In another broad aspect, there is provided a method for synchronizing data for dataset execution, the method comprising: detecting, by a synchronization server, publication of one or more source tables forming a canonical dataset; in response to detecting the publication of the one or more source tables, identifying, by the synchronization server, one or more processed tables to be updated in a processed dataset, the one or more processed tables corresponding to the one or more source tables; updating, by the synchronization server, the one or more processed tables in the processed dataset; determining, by the synchronization server, whether the one or more processed tables in the processed dataset were successfully updated within one or more tolerance level; and transmitting, by the synchronization server, a notification based on determining whether the one or more processed tables in the processed dataset were successfully updates within the one or more tolerance level.

In some cases, the method may further comprise: monitoring, by a synchronization server, publication of one or more processed tables; and determining, by the synchronization server, the one or more tolerance level corresponding to each of the one or more processed tables, the one or more tolerance level based on an execution requirement of a downstream application.

In some cases, the method may further comprise creating a checkpoint prior to the updating the one or more processed tables in the processed dataset.

In some cases, a selected table of the one or more processed tables may have a selected tolerance level of the one or more tolerance level associated therewith, and wherein the execution requirement for the selected table may be determined by: analyzing an update frequency of the selected table; analyzing an expected execution time of the downstream application; and determining whether the selected table can be successfully updated prior to the expected execution time based on the update frequency and the selected tolerance level.

In some cases, the downstream application may be a machine learning model.

In some cases, the method may further comprise: publishing, by a publisher server, the one or more processed tables.

In some cases, the method may further comprise: transforming the one or more processed tables into a format compatible with the machine learning model.

In some cases, the method may further comprise: processing the canonical dataset to remove sensitive information.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

Many organizations possess and maintain confidential data regarding their operations. For instance, some organizations may have confidential data concerning industrial formulas and processes. Other organizations may have confidential data concerning customers and their interactions with those customers. In a large organization, this confidential data may be stored in a variety of databases, which may have different, sometimes incompatible schemas, fields and compositions. A sufficiently large organization may have hundreds of millions of records across these various databases, corresponding to tens of thousands, hundreds of thousands or even millions of customers.

Organizations may employ enterprise computing environments, that include source databases or data stores to contain sensitive information, such as personally identifiable information (PII) that is required to be kept confidential. Often, it is not the entire record that is sensitive, but rather an element of the record.

In many cases, it may be desirable to use the data in the data store, or portions thereof, for additional purposes, or to reveal portions of the data to certain individuals or entities. For example, the data may be used to generate predictions or inferences using machine learning models. In such cases, in order to protect any PII in the data, masking or obfuscation can be employed to conceal or remove the sensitive information, such that it cannot be identified in the data to be used. Tokenization is one common approach for de-risking sensitive information. Tokenization involves substituting a sensitive data element with a non-sensitive equivalent, i.e. a token. Tokenization may be performed according to pre-specified rules, which may be stored in a configuration file.

Tokenization and other processing of sensitive data can be performed by an Enterprise Data Provisioning Platform (EDPP). The resulting tokenized data may be stored and/or updated periodically in other databases or data stores for use by the downstream applications, such as those that employ machine learning models. In one example, a publishing server may monitor for updates to the tokenized data and push such updates to the cloud database to satisfy the needs of downstream applications. Conversely, it may also monitor the cloud database for updates, and pull those updates into the EDPP for processing and possible updating of the source database.

Many or most downstream applications may only run on a periodic basis, e.g., daily, weekly, monthly or annually. For instance, a machine learning model that predicts monthly transactions may not need to execute daily. Accordingly, continuous real-time updating of all databases may not be feasible or desirable. Moreover, some database tables may be on the order of hundreds of megabytes, gigabytes, or even terabytes in size depending on the timeframe of the data required by a machine learning model (e.g., last week, last month, last year, etc.). Moreover, some machine learning models may use input from numerous tables, multiplying this issue.

Nevertheless, machine learning models may fail to operate correctly if the data required for making predictions is missing, out of date, or incomplete. Applying datasets with missing data or non-available data when required for executing machine learning models can lead to biased results in statistical analysis and machine learning modelling work. Thus, data latency and data availability are vital to monitor and track for Quality Assurance (QA) purposes.

Systems for monitoring synchronization provide valuable measurements and metrics for analyzing the pattern of data sent from one platform to another in order to understand trends, warn of data quality or other abnormal platform operating issues. However, missing data are still prevalent due to network miscommunications, unannounced infrastructure upgrades, platform timeout issues and even non-availability of the latest data in the source database. Verification is repetitive, expensive, time consuming and labor-intensive consideration and human analysis is often called for when making a determination as to what data is missing and to understand the root cause of the issue. This difficulty is further compounded, when there is a diverse set of data, in terms of quantity of tables and source database.

The described systems and methods generally provide for automatically verifying that the datasets required by machine learning models have been updated on time for the machine learning model to execute correctly.

Figure 1:
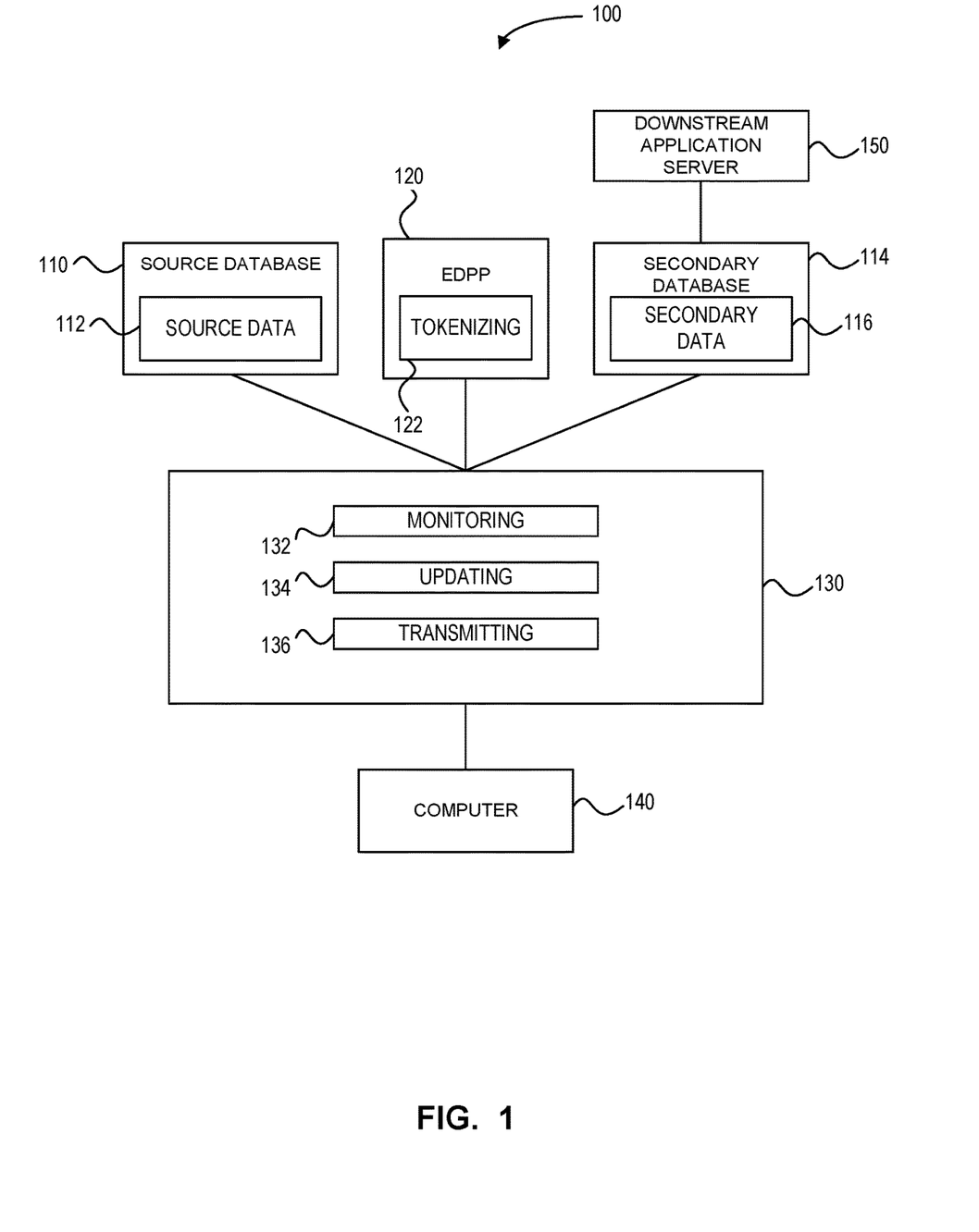
FIG. 1 is a schematic block diagram of an exemplary system for synchronizing data for dataset execution in accordance with at least some embodiments.

Referring now to FIG. 1, there is illustrated a block diagram of an example computing system, in accordance with at least some embodiments. Computing system 100 has a source database 110, a secondary database 114, an EDPP 120, a server 130, a computer 140, and at least one downstream application server 150. For convenience, the source database 110 and secondary database 114 are referred to herein as "databases" however it will be understood that each such database may be stored and provided by a database server, which is a computer server or servers configured to store and provide access to data using a database system.

The source database 110 contains source data 112, which may include records containing PII and thus may form a canonical dataset. The secondary database 114 contains secondary data 116, which may be result of processing source data 112 for the purposes of de-risking. The secondary data 116 may be previous versions of de-risked data from the source database 110. The at least one downstream application server 150, which may be a machine learning model, uses the secondary data 116 when executing. One or more export modules may periodically (e.g., daily, weekly, monthly, etc.) export data from the source database 110 to the EDPP 120. In some cases, the export data may be exported in the form of comma separated value (CSV) data, JavaScript Object Notation (JSON) data or Extensible Markup Language (XML) data, however other formats may also be used.

The EDPP 120, receives source data 112 exported by the source database 110, and processes it by way of a tokenization module 122 that de-risks the source data 112 to create tokenized data in a tokenized dataset. The EDPP 120 provides the tokenized dataset for updating the secondary database 114, for example by way of server 130.

The server 130, which may also be referred to as a publishing server, receives the tokenized dataset from the EDPP 120. The received tokenized data may be in the form of tokenized data tables, which may be transformed into respective DataFrames. The transformation also allows for verification on a one-to-one basis with the source database 110, including various quality-of-date checks such as row count and record count.

The server 130 may have, for example, a monitoring module 132, an updating module 134, and a transmitting module 136.

The server 130 monitors for changes in the configuration of the incoming tokenized data tables by way of the monitoring module 132. The monitoring module 132 checks for changes in schema (e.g., changes to the columns of the tokenized data tables), and if changes are detected, the server 130 compares versions of the data to determine if a configuration update is required in the secondary database. The server 130 compares the incoming tokenized data tables against the secondary data 116 in the secondary database 114 to determine the updates required in the secondary database 114. If an update is required, the server 130 determines the new structural details of the table being modified from the tokenized tables, as compared with a previous version from the secondary database.

If the server 130 determines that no configuration update has occurred, the table configuration can be retrieved from the secondary database 114.

The server 130 determines an update frequency for the table, such as daily, weekly, monthly or similar, which may be based on how often and when the downstream application server 150 requests data. The server 130 sets a tolerance level for the updates before the at least one downstream application server 150 uses the data. The tolerance level is used to determine how much of a buffer should be allowed for updates before the at least one downstream application server 150 uses the dataset to ensure that the at least one downstream application server 150 is using a complete and up-to-date dataset. The server 130 then updates the secondary database 114 with the incoming tokenized data table by way of the updating module 136.

The server 130 analyses requests from the at least one downstream application server 150, to determine the processed tables required by the at least one downstream application server 150 and the timing of execution. This ensures that if a given processed table is expected to be updated close to the model's execution time, the tolerance can be set appropriately. In some cases, the execution of the one or more applications (e.g., machine learning models) by the at least one downstream application server 150 can be delayed allowing the updates to complete before execution. In some cases, the tolerance may be used to flag that the dataset update should be scheduled differently, or to automatically reschedule it.

Once the server 130 has performed the action, the server 130 checks if any further updates have been made to the tokenized tables exported by EDPP 120 subsequent to the checkpoint and takes appropriate action. The appropriate action may be, for example, the server 130 performing additional updates to the processed table to account for the further updates and populating the secondary database 114, or raising an error. The server 130 checks to verify that the update is complete. This may be achieved by checking the byte size of the update relative to the incoming tokenized table, or by checking for a matching row count or record count.

The server 130 transmits a notification that the update is complete by way of the transmitting module 136. The notification may be sent to the computer 140. The computer 140 may be an end node computer where users may access the EDPP 120, the server 130, and the databases 110, 114.

The computer 140 may monitor and control the operations of the EDPP 120, the server 130, and the databases 110, 114. The computer 140 may also access the at least one downstream application server 150 to monitor or control execution. The user may alter the scheduling of the at least one downstream application server 150 relative to the tolerance set.

If there is a risk of missing data, which may occur due to a mismatch or due to the update taking longer than expected, the at least one downstream application server 150 may have begun using the data from an earlier checkpoint. If this is identified by the server 130, the server 130 may raise an error and send the notification to the computer 140.

The computer 140 may be linked to a dashboard that displays not only the notifications from the server 130, but also the current status of the data import and export.

The at least one downstream application server 150 may execute a machine learning model that performs actions such generating predictions or inferences for transactions or anticipated behaviour. The at least one downstream application server 150 may execute the model on a pre-determined basis such as daily, weekly, or monthly and relies on up-to-date data to generate predictions or inferences that are as accurate as possible.

Figure 2:
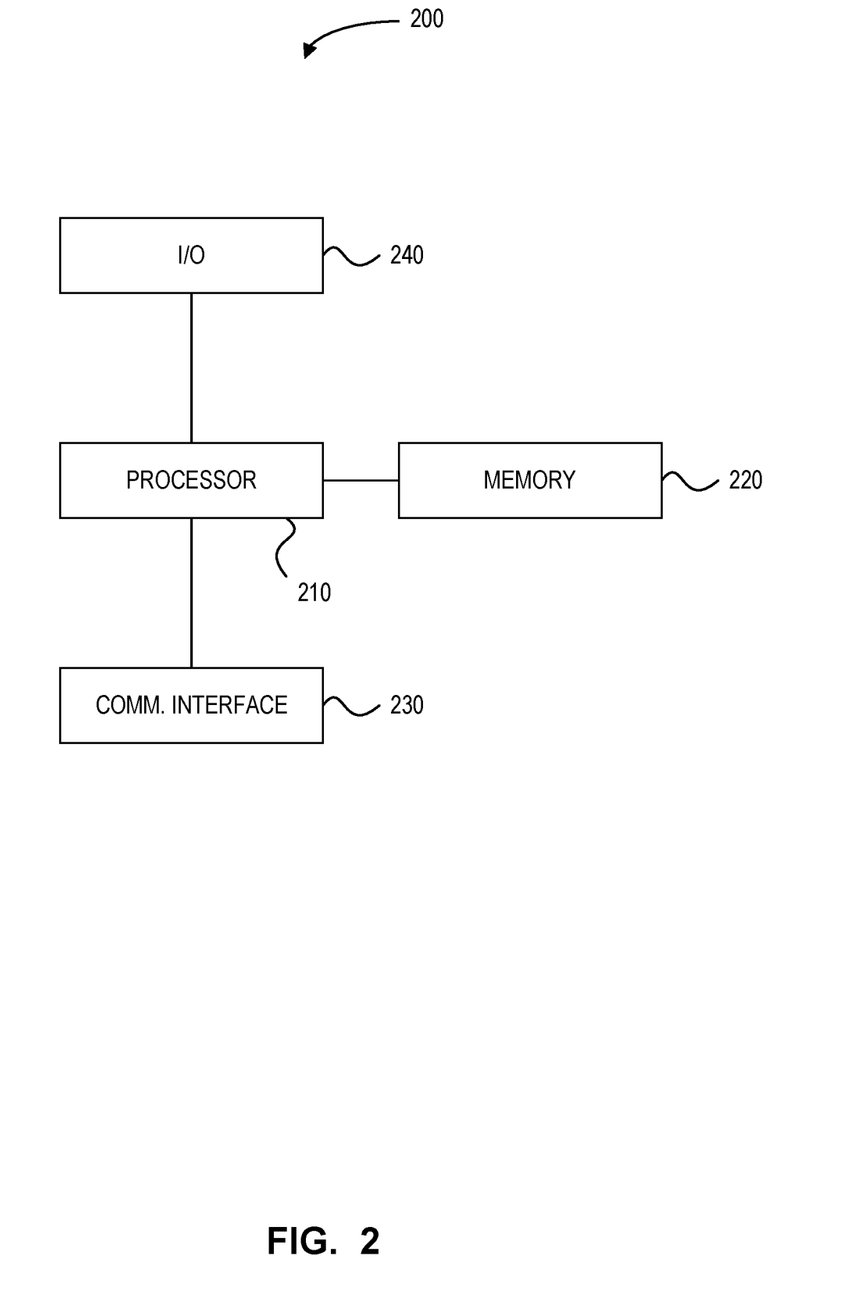
FIG. 2 is a block diagram of a computer in accordance with at least some embodiments.

Referring now to FIG. 2, there is illustrated a simplified block diagram of a computer in accordance with at least some embodiments. Computer 200 is an example implementation of a computer such as the source database 110, the secondary database 114, the EDPP 120, the server 130, the computer 140, and the at least one downstream application server 150. Computer 200 has at least one processor 210 operatively coupled to at least one memory 220, at least one communications interface 230, at least one input/output device 240.

The at least one memory 220 includes a volatile memory that stores instructions executed or executable by processor 210, and input and output data used or generated during execution of the instructions. Memory 220 may also include non-volatile memory used to store input and/or output data—e.g., within a database—along with program code containing executable instructions.

Processor 210 may transmit or receive data via communications interface 230 and may also transmit or receive data via any additional input/output device 240 as appropriate.

In some implementations, computer 200 may be batch processing system that is generally designed and optimized to run a large volume of operations at once, and are typically used to perform high-volume, repetitive tasks that do not require real-time interactive input or output. The database 110 may be one such example. Conversely, some implementations of computer 200 may be interactive systems that accept input (e.g., commands and data) and produce output in real-time. In contrast to batch processing systems, interactive systems generally are designed and optimized to perform small, discrete tasks as quickly as possible, although in some cases they may also be tasked with performing long-running computations similar to batch processing tasks.

Figure 3A:
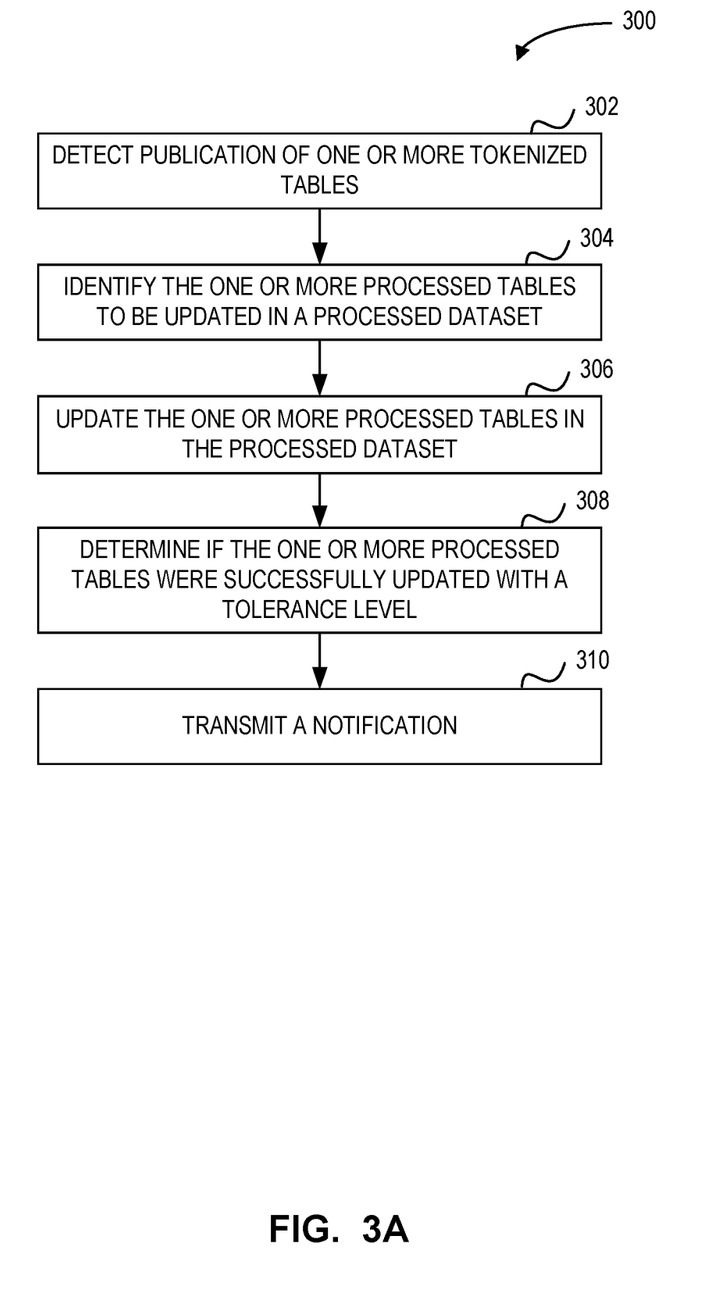
FIG. 3A is a flowchart diagram of an example method of synchronizing data for dataset execution.

Referring now to FIG. 3A, there is illustrated a flowchart diagram of an example method for synchronizing data for dataset execution. The method 300 may be carried out, for example, by the system 100 of FIG. 1.

The method 300 begins at step 302 and the server 130 detects the publication of one or more tokenized tables, e.g., by an EDPP 120.

At step 304, the server 130 identifies which of the processed tables (i.e., corresponding to the tokenized tables) are to be updated in a processed dataset of a secondary database.

At step 306, the server 130 updates the processed tables of the secondary database 114 with updated data from the incoming tokenized data tables by way of the updating module 134, as described herein.

At step 308, the server 130 determines if the processed data tables were successfully updated, in accordance with the tolerance level.

At step 310, the server 130 transmits a notification by way of the transmitting module 136, which may be sent to the computer 140.

Figure 3B:
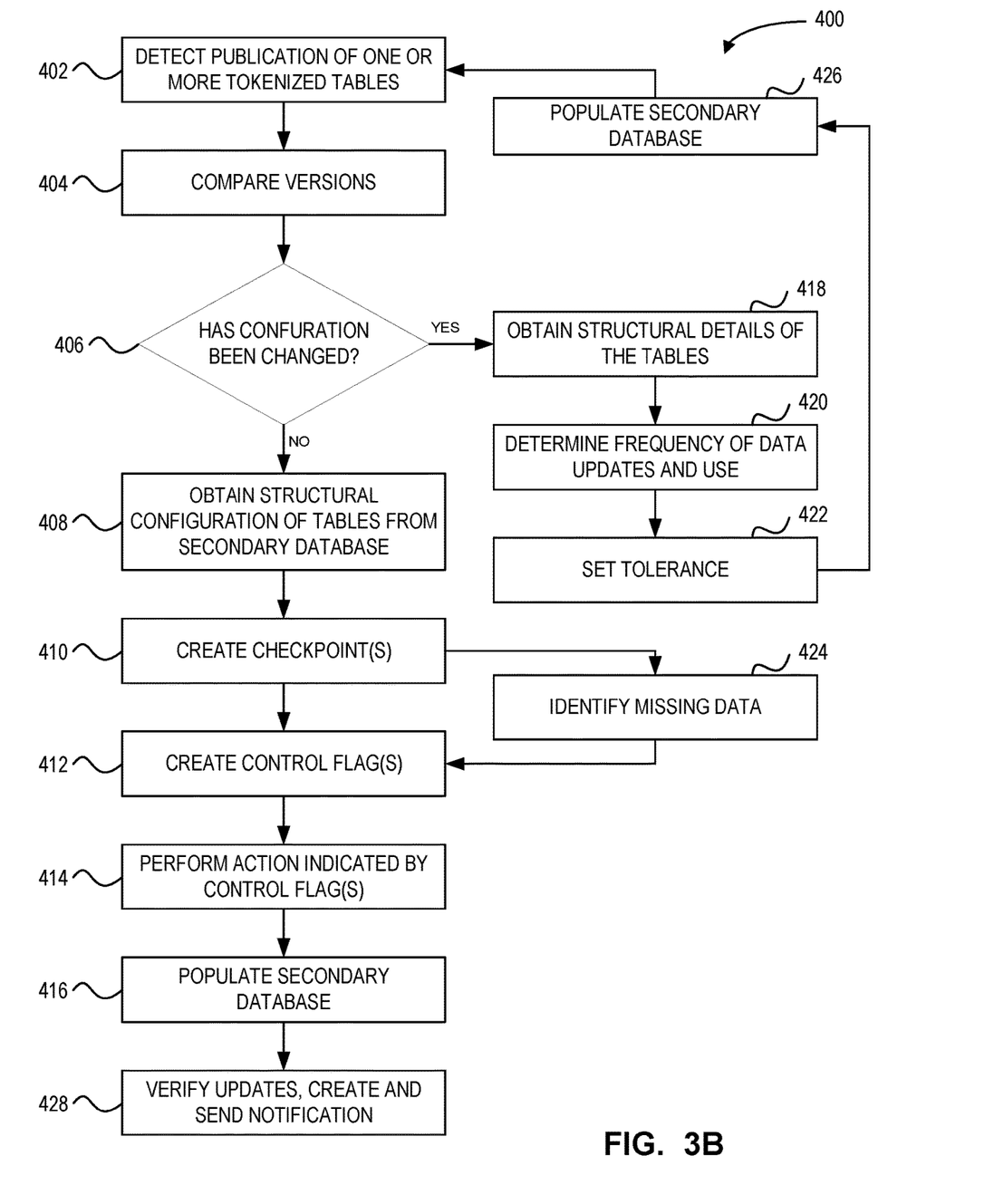
FIG. 3B is a flowchart diagram showing additional steps of the example method of FIG. 3A.

Referring now to FIG. 3B, there is illustrated a flowchart diagram of another example method for synchronizing data for dataset execution. The method 400 may be carried out, for example, by the system 100 of FIG. 1. Generally, method 400 may be similar to method 300 of FIG. 3A albeit with additional acts. At step 402, the server 130 detects the publication of one or more tokenized tables. The server's 130 monitoring module 132 checks for changes in the configuration of the incoming tokenized tables. The incoming tokenized tables may be source data 112 from the source database than has been processed by the tokenizing module 122 in the EDPP 120 to de-risk the source data 112.

At step 404, the server 130 compares the one or more tokenized tables against previous versions of corresponding processed tables stored in the secondary database 114. For example, the server 130 compares the schema of the incoming tokenized tables against the processed tables in the secondary database 114 to determine the updates required to the processed tables in the secondary database 114. Steps 402 and 404 are performed by the monitoring module 132 of the server 130.

At step 406, the server 130 determines if the configuration of the one or more processed tables has been changed. If the configuration has not been changed the method 400 moves to step 408. If the configuration has been changed the method 400 moves to step 418.

At step 408, the server 130 obtains the structural configuration of the one or more processed tables to be updated from the secondary database 114. At step 410, the server 130 creates checkpoints for the one or more processed tables. Once the checkpoint has been created, at step 424 the server 130 identifies any missing data to be added to the secondary database from the one or more processed tables.

At step 412, at control flag is created. The control flag indicates a particular action is to be performed. This may be publishing the one or more processed tables to the secondary database 114 or raising a notification that there is data missing from the one or more processed tables.

At step 414, the server 130 performs the action indicated by the control flag. The server 130 then checks for any updates made since the setting of the checkpoint and takes appropriate action. At step 416, the one or more processed tables in the secondary database 114 are updated by the updating module 134.

If it is determined at step 406 that the configuration has been changed the method 400 moves to step 418. At step 418, the server 130 obtains the structural configuration of the one or more tokenized tables.

At step 420, the server 130 determines the frequency at which the one or more processed tables are used by the at least one downstream application server 150. The server 130 analyses historical requests from the at least one downstream application server 150 to determine the tables required. The server 130 determines how often the one or more processed tables are updated, and the frequency at which the at least one downstream application server 150 executes. This ensures that if a given table is expected to be updated close to a machine learnings model's execution time, the tolerance can be set appropriately.

At step 422, based on the determined frequencies, the server 130 sets a tolerance level for the one or more processed tables. The server 130 sets the tolerance level for the updates before the at least one downstream application server 150 uses the data. The tolerance level is used to determine how much of a buffer should be allowed for updates before the at least one downstream application server 150 uses the dataset.

At step 424, the one or more processed tables in the secondary database 114 are updated with the one or more tokenized tables, by the updating module 134, and the method 400 repeats.

At step 426, the server 130 verifies the status of the updates, which may be based on the byte size of the update relative to the incoming tokenized table, or by checking a row count or record count of the one or more processed tables against the incoming tokenized table. The server 130 then generates a notification that is transmitted, by the transmitting module 136, to the computer 140. The notification verifies that the update is complete or that there is an error in the one or more datasets, or that the at least one downstream application server 150 is executing with an incomplete dataset, or an older version of the dataset. The computer 140 may be an end node computer where users may access the EDPP 120, the server 130, and the databases 110, 114. The computer 140 may monitor and control the operations of the EDPP 120, the server 130, and the databases 110, 114. The computer 140 may also access the at least one downstream application server 150 to monitor or control execution.

The described system and method generally provide for automatically determining whether any given machine learning model will have a complete and updated dataset that is synchronized from the source database when it is scheduled to execute. This applies to cases where different tables used by a machine learning model have different update schedules. For example, some tables may update daily, whereas others update only monthly or annually. The described method can be used to verify data correctness for a machine learning model or downstream application that is executed manually. The described method also applies to systems that incorporate multiple downstream applications or machine learning models, ranging from dozens up to hundreds of machine learning models, with each model using some or all hundreds or thousands of tables.

Although the embodiment described herein shows only one downstream application server 150, the system 100 may include multiple downstream applications 150 performing a variety of different functions and using a variety of different data tables or all the data tables when executing.

Although the embodiment described herein shows the source database 110 and the secondary database 114 as separate entities in FIG. 1, the databases 110, 114 may be hosted on the same hardware, or on separate hardware, or may be cloud-based. Although the tokenizing module 122 is shown as being hosted at the EDPP 120, the tokenizing module 122 may be hosted at server 130 with the tokenization occurring at the server 130. In some cases the EDPP 120 and the server 130 may be the same server.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g. 112*a*, or 1121). All elements with a common base number may be referred to collectively or generically using the base number without a suffix (e.g. 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g. a pushbutton keyboard, mouse, a touchscreen, and the like), and at least one output device (e.g. a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. A system for synchronizing data for dataset execution, the system comprising:
   a source database storing a canonical dataset;
   a secondary database storing a processed dataset;
   a synchronization server comprising a processor and a memory, the processor configured to:
      monitor for a publication of one or more source tables;
      when the publication is detected, identify one or more processed tables to be updated in the processed dataset, the one or more processed tables corresponding to the one or more source tables;
      determine one or more tolerance level corresponding to each of the one or more processed tables, the one or more tolerance level based on an execution requirement of a downstream application, wherein the execution requirement includes an expected start time for execution of the downstream application, and wherein the one or more tolerance level includes an allowable time buffer before the expected start time;
      update the one or more processed tables in the processed dataset;
      determine whether the one or more processed tables in the processed dataset were successfully updated within the allowable time buffer before the expected start time; and
      transmit a notification based on determining whether the one or more processed tables in the processed dataset were successfully updated within the allowable time buffer before the expected start time.

2. The system of claim 1, wherein the processor is further configured to create a checkpoint prior to updating the one or more processed tables in the processed dataset.

3. The system of claim 1, wherein a selected table of the one or more processed tables has a selected tolerance level of the one or more tolerance level associated therewith, wherein the selected tolerance level is a time buffer, and wherein the execution requirement for the selected table is determined by:
   analyzing an update frequency of the selected table;
   analyzing the expected start time of the downstream application;
   determining whether the selected table can be successfully updated prior to the expected start time based on the update frequency; and
   setting the selected tolerance level based on the determining whether the selected table can be successfully updated prior to the expected start time.

4. The system of claim 1, wherein the downstream application is a machine learning model.

5. The system of claim 4, wherein the one or more processed tables are transformed into a format compatible with the machine learning model.

6. The system of claim 1, further comprising a publisher server comprising a first processor and a first memory, the first processor configured to publish the one or more source tables.

7. The system of claim 1, wherein the one or more source tables are generated by processing the canonical dataset to remove sensitive information.

8. A method for synchronizing data for dataset execution, the method comprising:
   detecting, by a synchronization server, publication of one or more source tables forming a canonical dataset;
   in response to detecting the publication of the one or more source tables, identifying, by the synchronization server, one or more processed tables to be updated in a processed dataset, the one or more processed tables corresponding to the one or more source tables;
   determining one or more tolerance level corresponding to each of the one or more processed tables, the one or more tolerance level based on an execution requirement of a downstream application, wherein the execution requirement includes an expected start time for execution of the downstream application, and wherein the one or more tolerance level includes an allowable time buffer before the expected start time;
   updating, by the synchronization server, the one or more processed tables in the processed dataset;
   determining, by the synchronization server, whether the one or more processed tables in the processed dataset were successfully updated within the allowable time buffer before the expected start time; and
   transmitting, by the synchronization server, a notification based on determining whether the one or more processed tables in the processed dataset were successfully updates within the allowable time buffer before the expected start time.

9. The method of claim 8, further comprising:
   monitoring, by a synchronization server, publication of one or more processed tables.

10. The method of claim 9, wherein a selected table of the one or more processed tables has a selected tolerance level of the one or more tolerance level associated therewith, wherein the selected tolerance level is a time buffer, and wherein the execution requirement for the selected table is determined by:
    analyzing an update frequency of the selected table;
    analyzing the expected start time of the downstream application;
    determining whether the selected table can be successfully updated prior to the expected start time based on the update frequency; and
    setting the selected tolerance level based on the determining whether the selected table can be successfully updated prior to the expected start time.

11. The method of claim 9, wherein the downstream application is a machine learning model.

12. The method of claim 11, further comprising:
    transforming the one or more processed tables into a format compatible with the machine learning model.

13. The method of claim 8, further comprising:
creating a checkpoint prior to the updating the one or more processed tables in the processed dataset.

14. The method of claim 8, further comprising:
publishing, by a publisher server, the one or more processed tables.

15. The method of claim 8, further comprising:
processing the canonical dataset to remove sensitive information.

16. A non-transitory computer readable medium storing computer executable instructions which, when executed by at least one computer processor, cause the at least one computer processor to carry out a method for synchronizing data for dataset execution, the method comprising:

detecting, by a synchronization server, publication of one or more source tables forming a canonical dataset;

in response to detecting the publication of the one or more source tables, identifying, by the synchronization server, one or more processed tables to be updated in a processed dataset, the one or more processed tables corresponding to the one or more source tables;

determining one or more tolerance level corresponding to each of the one or more processed tables, the one or more tolerance level based on an execution requirement of a downstream application, wherein the execution requirement includes an expected start time for execution of the downstream application, and wherein the one or more tolerance level includes an allowable time buffer before the expected start time;

updating, by the synchronization server, the one or more processed tables in the processed dataset;

determining, by the synchronization server, whether the one or more processed tables in the processed dataset were successfully updated within the allowable time buffer before the expected start time; and     transmitting, by the synchronization server, a notification based on determining whether the one or more processed tables in the processed dataset were successfully updates within the allowable time buffer before the expected start time.

\* \* \* \* \*